United States Patent
Monteleone et al.

(10) Patent No.: US 10,805,763 B2
(45) Date of Patent: *Oct. 13, 2020

(54) SYSTEM AND METHOD FOR TRACKING A VEHICLE'S COURSE BY COMPARING GEOLOCATION DATA FROM A KNOWN COURSE

(71) Applicant: LapKing Holdings, LLC, Lewisville, TX (US)

(72) Inventors: Vincent G. Monteleone, Aubrey, TX (US); Jerry Lee Chappell, Jr., Lewisville, TX (US)

(73) Assignee: LapKing Holdings, LLC, Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,769

(22) Filed: Oct. 7, 2019

(65) Prior Publication Data
US 2020/0037100 A1 Jan. 30, 2020

Related U.S. Application Data

(63) Continuation of application No. 16/195,131, filed on Nov. 19, 2018, now Pat. No. 10,440,507, which is a
(Continued)

(51) Int. Cl.
*H04W 4/021* (2018.01)
*H04W 4/44* (2018.01)
(Continued)

(52) U.S. Cl.
CPC .............. *H04W 4/021* (2013.01); *A63K 3/00* (2013.01); *G01S 5/0009* (2013.01); *G01S 19/42* (2013.01);
(Continued)

(58) Field of Classification Search
None
See application file for complete search history.

(56) References Cited

U.S. PATENT DOCUMENTS

| 7,797,421 B1 | 9/2010 | Scofield et al. |
| 8,014,945 B2 | 9/2011 | Cooper et al. |
| | (Continued) | |

FOREIGN PATENT DOCUMENTS

| EP | 2825850 B1 | 1/2015 |
| EP | 3144703 A1 | 3/2017 |
| | (Continued) | |

*Primary Examiner* — John F Mortell
(74) *Attorney, Agent, or Firm* — Vincent J. Allen; J. Andrew Reed; Carstens & Cahoon, LLP

(57) ABSTRACT

A computer-implemented method and system for tracking a vehicle's course using geolocation data is provided. The method comprises obtaining a set of predetermined GPS locations representing a closed course; tracking movements of a user using a GPS controller; authenticating the movements of the user against the set of predetermined GPS locations while the client terminal is within a predetermined distance of at least one of the set of predetermined GPS locations; and presenting consolidated timing information about the user's movements along the set of predetermined GPS locations. The system comprises a central processing server in communication with a computer network and configured to obtain information from a central database; and one or more client terminals in communication with the central processing server via the computer network, and configured to provide a graphical user interface for user interaction with the central processing server.

20 Claims, 7 Drawing Sheets

Related U.S. Application Data continuation of application No. 15/844,872, filed on Dec. 18, 2017, now Pat. No. 10,136,253.

(51) Int. Cl.
  *G01S 19/42* (2010.01)
  *A63K 3/00* (2006.01)
  *G01S 5/00* (2006.01)
  *H04W 4/02* (2018.01)
  *G07C 1/22* (2006.01)
  *H04W 4/30* (2018.01)

(52) U.S. Cl.
  CPC .............. *G07C 1/22* (2013.01); *H04W 4/025* (2013.01); *H04W 4/027* (2013.01); *H04W 4/30* (2018.02)

(56) References Cited

U.S. PATENT DOCUMENTS

| | | | |
|---|---|---|---|
| 8,676,428 B2 | 3/2014 | Richardson et al. | |
| 8,718,927 B2 | 5/2014 | Kitchel et al. | |
| 8,768,604 B1 | 7/2014 | Klimek | |
| 8,996,301 B2 | 3/2015 | Kitchel et al. | |
| 9,116,922 B2 | 8/2015 | Shaw et al. | |
| 9,208,175 B2 | 12/2015 | Shaw et al. | |
| 9,267,798 B2 | 2/2016 | Kitchel | |
| 9,291,713 B2 | 3/2016 | Shaw et al. | |
| 9,297,651 B2 | 3/2016 | Kitchel | |
| 9,534,908 B2 | 1/2017 | Kitchel et al. | |
| 9,595,073 B1 * | 3/2017 | Ding | G06Q 10/063 |
| 9,615,215 B2 * | 4/2017 | Yuen | A61B 5/6838 |
| 9,664,518 B2 | 5/2017 | Mach | |
| 9,709,408 B2 | 7/2017 | Kitchel et al. | |
| 9,778,053 B2 | 10/2017 | Kitchel | |
| 9,803,989 B2 | 10/2017 | Kitchel | |
| 9,804,269 B2 | 10/2017 | Shaw et al. | |
| 10,228,258 B2 | 3/2019 | Mach et al. | |
| 10,240,939 B2 | 3/2019 | Kitchel | |
| 10,323,948 B2 | 6/2019 | Kitchel et al. | |
| 10,429,192 B2 | 10/2019 | Kitchel | |
| 10,515,101 B2 | 12/2019 | Robb | |
| 2011/0208429 A1 | 8/2011 | Zheng et al. | |
| 2011/0289031 A1 | 11/2011 | Zheng et al. | |
| 2012/0253488 A1 | 10/2012 | Shaw et al. | |
| 2012/0326890 A1 * | 12/2012 | Cross | G08G 1/087 340/906 |
| 2013/0053990 A1 | 2/2013 | Ackland | |
| 2016/0055176 A1 | 2/2016 | Shaw et al. | |
| 2017/0074988 A1 | 3/2017 | Kitchel | |
| 2017/0347240 A1 | 11/2017 | Wilde et al. | |
| 2019/0154457 A1 | 5/2019 | Mach et al. | |
| 2019/0353488 A1 | 11/2019 | Kitchel | |

FOREIGN PATENT DOCUMENTS

| | | |
|---|---|---|
| EP | 3401703 B1 | 11/2018 |
| WO | 2012134627 A2 | 10/2012 |
| WO | 2012135602 A2 | 10/2012 |
| WO | 2013138181 A1 | 9/2013 |
| WO | 2013138183 A1 | 9/2013 |

* cited by examiner

SYSTEM AND METHOD FOR TRACKING A VEHICLE'S COURSE BY COMPARING GEOLOCATION DATA FROM A KNOWN COURSE

CROSS-REFERENCE TO RELATED APPLICATIONS

This application is a Continuation of U.S. patent application Ser. No. 16/195,131 filed Nov. 19, 2018 which is a Continuation of U.S. patent application Ser. No. 15/844,872 filed Dec. 18, 2017, and issued as U.S. Pat. No. 10,136,253 on Nov. 20, 2018, all of which are incorporated herein by reference in their entirety.

BACKGROUND OF INVENTION

1. Field of Invention

The present invention relates to a system and a method related to obtaining, processing and/or displaying GPS data from a vehicle and authenticating the vehicle's course by processing data from the vehicle and comparing to geolocation data for a known course. The invention further relates to the transfer of data from a GPS receiver to a computing device for processing and displaying to users of the computing device.

2. Description of Related Art Including Information Disclosed Under 37 C.F.R. 1.97 and 1.98

This section is intended to provide a background or context. The description herein may include concepts that could be pursued but are not necessarily ones that have been previously conceived or pursued. Therefore, unless otherwise indicated herein, what is described in this section is not prior art in this application and is not admitted to be prior art by inclusion in this section.

People who navigate on a closed course are often interested in tracking information about lap times on the closed course and comparing with others on the course. This can be done using stopwatches or the like. The problem with using a stopwatch is that it's cumbersome, difficult to compare times quickly or during competition, and subject to course cutting that may result in inaccurate comparisons. Moreover, current GPS processing systems do not allow users to easily compare data and do not provide for a means to authenticate or confirm that the course was followed by the user. Current GPS processing systems require a separate GPS unit in order to get an accurate and precise calculation of users' geographic location.

What is needed is for a method and system that tracks user geolocation data around a closed course and compares that data to a known location data in a way that allows users to compare their times among other users of the closed course on their mobile computing devices or other computing devices.

BRIEF SUMMARY

In certain example embodiments described, methods and system support tracking a vehicle's course using geolocation data. The disclosed technique and related system comprise obtaining, from a central database, a set of predetermined GPS locations representing a closed course; tracking movements of a user using a GPS controller, where tracking the movements of the user further comprises timing the movements of the user; authenticating the movements of the user against the set of predetermined GPS locations while the client terminal is within a predetermined distance of at least one of the set of predetermined GPS locations; determining whether successful authentication of the user's movements is greater than a predetermined success threshold; and upon determining whether successful authentication of the user's movements is greater than a predetermined success threshold, storing timing information in the central database, and retrieving and presenting the timing information on the client terminal.

Other embodiments are also disclosed herein. Another embodiment provides that the predetermined distance is 8 meters. Yet another embodiment further comprises aggregating the consolidated timing information of a plurality of users into an ordered list and presenting the ordered list to the plurality of users on the graphical user interface on the client terminal. The successful authentication can comprise authentication of a predetermined number of the set of predetermined GPS locations.

The disclosed principles can also be provided through a system for tracking a vehicle's course using geolocation data. The system comprises a central processing server in communication with a computer network and configured to obtain information from a central database; one or more client terminals in communication with the central processing server via the computer network, and configured to provide a graphical user interface for user interaction with the central processing server. The one or more client terminals of the system are configured to obtain, from the central database, a set of predetermined GPS locations representing a closed course; track movements of a user using a GPS controller, where tracking the movements of the user further comprises timing the movements of the user; authenticate the movements of the user against the set of predetermined GPS locations while the client terminal is within a predetermined distance of at least one of the set of predetermined GPS locations; and upon determining whether successful authentication of the user's movements is greater than a predetermined success threshold, storing timing information in the central database, and retrieving and presenting the timing information on the client terminal.

In another embodiment, the tracking system provides that the predetermined distance is 8 meters. The one or more client terminals can be further configured to aggregate the consolidated timing information of a plurality of users into an ordered list and present the ordered list to the plurality of users. Also, successful authentication can comprise authentication of a predetermined number of the set of predetermined location positions based on the sequential order.

In yet another exemplary embodiment, a closed course generation system used with a tracking system for tracking a vehicle's course using geolocation data is disclosed The closed course generation system can comprise a central processing server in communication with a computer network and configured to obtain information from a central database; and a mobile device in communication with the central processing server via the computer network, comprises a geolocation controller, and is configured to provide a graphical user interface for user interaction with the central processing server. The mobile device can be configured to track a path using the geolocation controller along the closed course; record geolocation positions of the closed course to a set of predetermined geolocation positions; and store the set of predetermined geolocation positions to the central database. The set of predetermined geolocation is then accessed by one or more client terminals of the tracking system, and then the one or more client terminals tracks movements of users of the one or more client terminals, authenticates the movements of the users against the set of predetermined geolocation positions while the one or more client terminals is within a predetermined distance of at least one of the set of predetermined geolocation positions; and upon determining whether successful authentication of the users' movements is greater than a predetermined success threshold, stores timing information in the central database.

BRIEF DESCRIPTION OF THE DRAWINGS

The present invention will be more fully understood by reference to the following detailed description of the preferred embodiments of the present invention when read in conjunction with the accompanying drawings, wherein.

Figure 1:
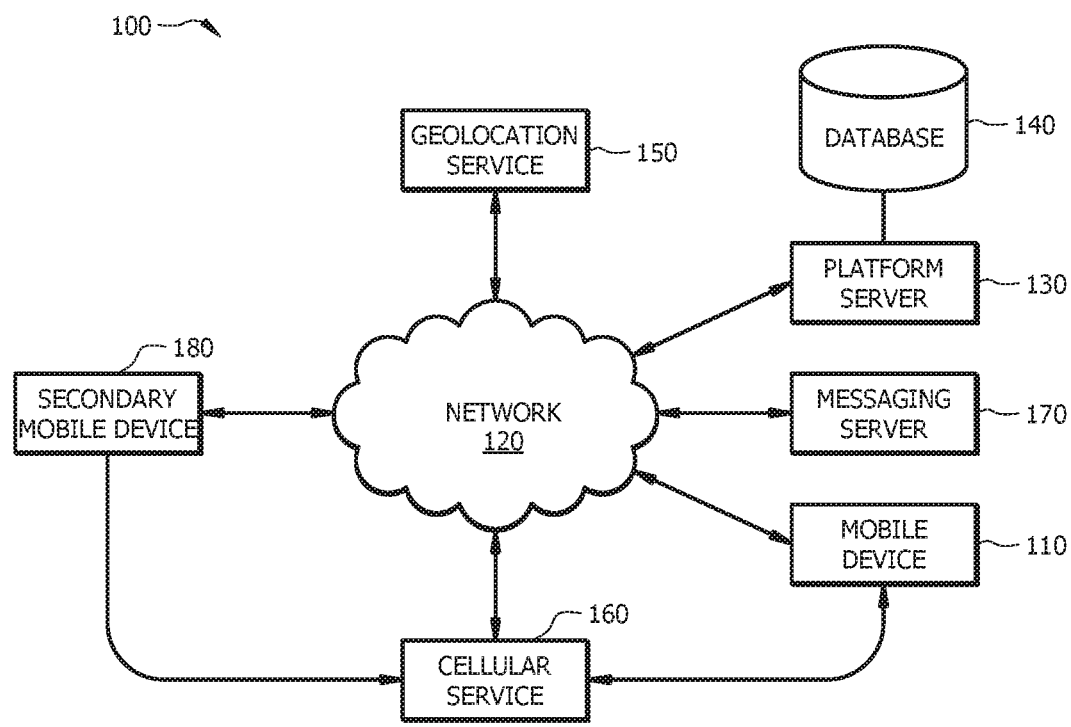
FIG. 1 illustrates a block diagram of an exemplary vehicle tracking system.

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION

The disclosed principles provide a number of innovations, including novel systems and method for facilitating a unique vehicle tracking platform. The system and method can be used for racing, such as motocross, karting, snow-cross, UTV racing, and ATV racing, or for training purposes. The platform disclosed herein may also be used for any other type of racing activity or contest, or any other type of timed contest. A detailed discussion of the exemplary platform is provided below; however, it should be understood that the embodiments described herein are only exemplary and do not limit the broader scope of the disclosed principles.

Generally speaking, the exemplary vehicle tracking technique facilitated by the disclosed principles involves acquiring a set of geolocation positions that represent a closed course, and using the predetermined set of geolocation positions as a backdrop against tracking the geolocation of a user along the closed course. These geolocation positions can be GPS locations or GPS coordinates expressed using latitude and longitude, and are generated by closed course proprietors, which is discussed below. The user's geolocation and time at the geolocation is recorded and tracked, and this tracked information is authenticated against the set of geolocation positions to ensure that the user is moving to locations as prescribed by the set of geolocation positions. The tracked information needs a successful authentication greater than a predetermined success threshold, which can be called a success rate, and this is further disclosed below. Then, the vehicle tracking technique presents timing information about the user's movements along the set of predetermined location positions, so that each user using the vehicle tracking technique is able to see his lap time when he or she finishes a lap of the set of geolocation positions.

A lap as described herein is one circuit of a track or other predetermined closed course, and when used with the exemplary technique, a user completes a lap when his tracked movements successfully matches, within a predetermined tolerance based on the predetermined success threshold, the set of predetermined geolocation positions, which is further disclosed below. As such, the disclosed technique allows users' course and/or lap time to be tracked on the predetermined course, such as an existing racetrack.

Established closed courses as described herein are closed courses where closed course proprietors have created a set of geolocation positions that represents their closed courses. The exemplary vehicle tracking technique allows closed course proprietors to create the set of geolocation positions for their closed courses, and the geolocation positions can be edited or modified as needed to provide maximum accuracy and entertainment for patrons of closed courses. However, the technique can be used for any closed course and is not limited to race tracks. As mentioned earlier, the set of geolocation positions represents a closed course and the set of geolocation positions corresponds to and map to physical geolocation positions on the closed course.

A closed course proprietor is herein used to describe administrators of the disclosed technique and any system or method using any embodiments or techniques disclosed herein. A closed course proprietor may also be the owner of a closed course.

To establish a closed course, proprietors can use the disclosed technique to track their movements on the closed course and starting with a start/finish point, the technique records a geolocation position every 16 meters. Once the proprietor is back to the start/finish point, the set of geolocation positions is created and uploaded to a database.

In another embodiment, once the set of geolocation positions for a closed course are created and set down by the closed course proprietor, patrons of a closed course can use the disclosed exemplary technique to keep track of and log their lap times. As an incentive to use the disclosed exemplary technique, lap times for others users can be aggregated and consolidated for presentation to all users, and a marker for the best lap time for a particular closed course is awarded to the user with the fastest lap time. Calculation of lap time is disclosed further below.

In an exemplary embodiment, a user can manually activate the disclosed exemplary technique to track his movements around a closed course. To accurately determine the user's lap time, the disclosed exemplary technique can start tracking the user's movements when the user's geolocation coordinates change. Alternatively, the disclosed exemplary technique can use a gyroscope, accelerometer, or any currently available or later developed motion sensor to detect any initial movements by the user to indicate the technique should start tracking the user's movements. Once the user's lap time has been determined, the user can share the lap time with others.

The disclosed exemplary technique tracks a user's movements using geolocation technology, such as global positioning system (GPS) technology, Bluetooth, Near Field Communication (NFC) technology, and other currently existing or later developed technology for determining the physical location of a user.

Further, the user can look at a history of his lap times at a particular closed course or overall. Also, as previously mentioned, because the user can share lap times with other users, the user can access and view any lap time shared by other users. Consequently, users cannot access or view any lap time not shared by other users. Lap times can be sorted based on any subset of information of which lap time is composed, such as time, username, etc. The disclosed exemplary technique can also sort based on any other analyzed statistic, such as fastest start, highest speed, etc.

As mentioned previously, the set of geolocation positions corresponds to and map to physical geolocation positions on the closed course. In an exemplary embodiment, the set of geolocation positions can be a set of GPS coordinates, and in another embodiment, the set of geolocation positions can be transponders positioned at certain geolocations along the closed course. Any currently existing or later developed technology can be used for transponders indicating the set of geolocation positions.

Figure 2:
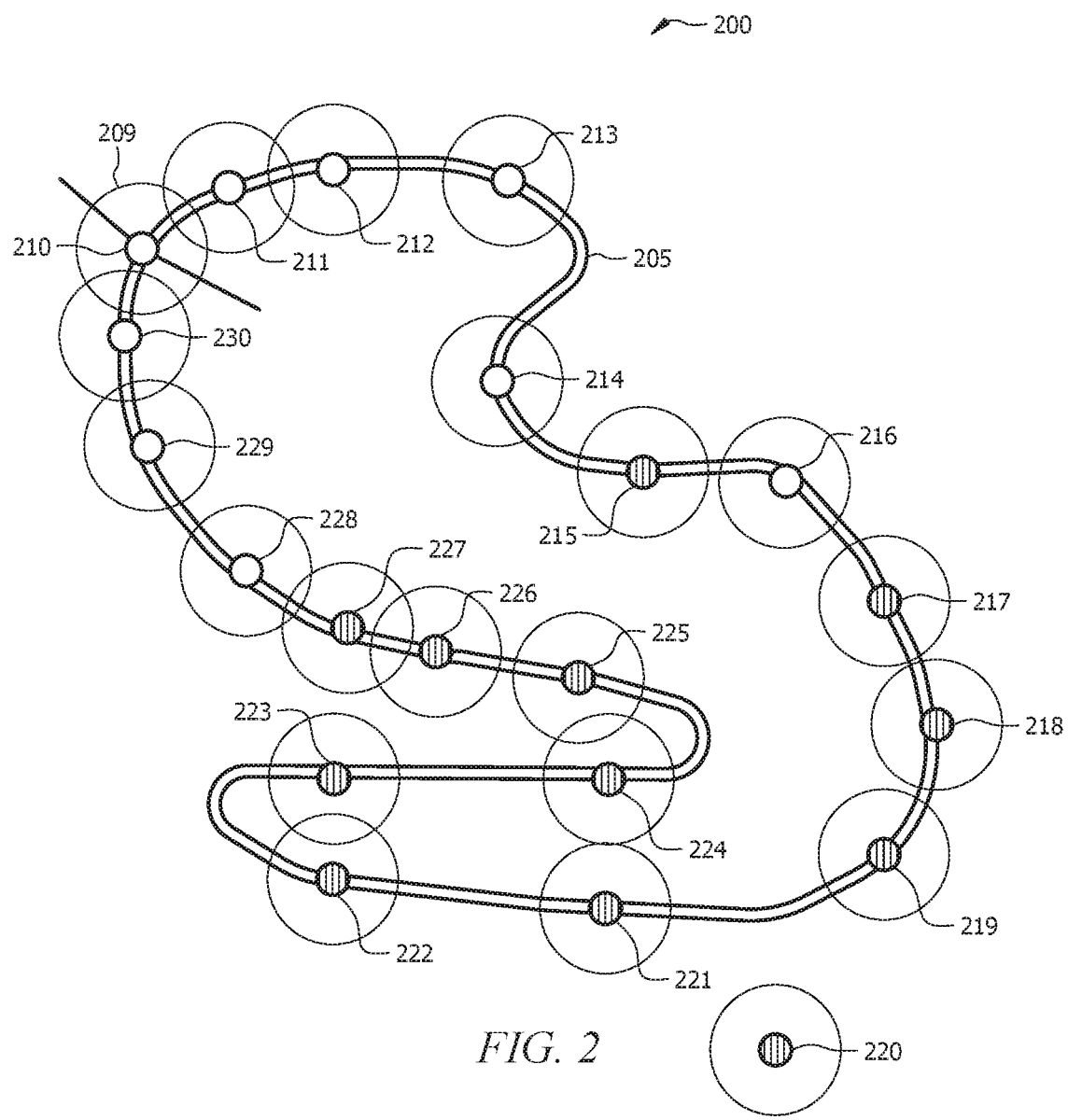
FIG. 2 is an exemplary illustration of a set of geolocation positions on a closed course.

The disclosed exemplary technique needs to provide accuracy and precision so that users cannot cut the course in order to get a better lap time. To provide accuracy and precision and to deter any cheating, the disclosed exemplary technique tracks the movements of users and authenticates the user's movements against the set of predetermined geolocation positions by using a predetermined distance from the predetermined geolocation positions. The predetermined distance creates an area that the user needs to pass through to successfully authenticate the predetermined geolocation positions. The predetermined distance may be set and modified by the closed course proprietor to fit a particular track's width and overall size. Alternatively, the system can automatically change the predetermined distance based on history of users not appearing in certain portions of the area formed by the predetermined distance of a geolocation position. Other factors can be used for refining the predetermined distance. FIG. 2 further discusses the accuracy and precision of the disclosed exemplary technique.

Further, in one embodiment, the disclosed exemplary technique allows users to discover or find nearby closed courses by determining the geolocation of the user and retrieving the geolocation of nearby closed courses. The disclosed exemplary technique can engage geolocation technology or services to identify nearby or established closed courses. In this embodiment, other types of geolocation technology or services can be used to determine the geolocation of the user, as compared to the geolocation technology or services used for tracking the user's movements on a closed course. The exemplary embodiment can use cellular service to determine the geolocation of the user. In another exemplary embodiment, the disclosed exemplary technique has access to a list or map of established closed courses. The list or map of established closed courses may include physical addresses, GPS coordinates, or any other type of group of numbers used to indicate the geographical location of a user.

In another exemplary embodiment, users can use and join groups for sharing lap times. These groups of users may base membership on invitation, geographic availability, or any other factor. Groups of the exemplary embodiment can facilitate messaging between the members of the group, and messages between group members can be supported by SMS, a messaging system supported by the disclosed exemplary technique, or any other messaging system, currently existing or later developed. Further, users may initiate races for members of the group, which is discussed in further detail below.

A user can also have a profile for aggregating the user's lap times at various closed courses. The profile can also include a list of the user's friends and their best lap time at the various closed courses. The friend list may instead present information that the user has indicated that he wants to see with each entry on the friend list. Alternatively, the list of the user's friends may present any information that each friend has indicated to be shown on the user's friend list. In another embodiment, the technique can provide a feature for following and un-following specific users. With following specific users, the user can get updates on the activity of the users he is following.

One exemplary embodiment allows users to win prizes or trophies associated with a closed course. A closed course proprietor may allow for any number of prizes or trophies for his closed course, and the disclosed exemplary technique can present a view of the winners of the prizes or trophies authorized by the closed course proprietor at a closed course. In another exemplary embodiment, trophies or prizes can be given to the user with the best lap time within a group of users.

The advantage of the exemplary embodiments herein allow for less hardware to be used to accomplish the disclosed principles, and allows for greater rate of efficiency, accuracy, and prevision because there is known information and data against which the user's course can be compared and authenticated.

Exemplary applications can be implemented via one or more secure web sites, or other similar dedicated sites accessible via a computer network. While in one embodiment the disclosed techniques are used with mobile computing devices, in another embodiment, the disclosed techniques may be used with any combination of mobile computing devices and computing components or devices. Other embodiments can provide specific capabilities with the disclosed techniques facilitated by a physical location, such as a sports stadium or other similar closed course establishments accessible by patrons.

FIG. 1 illustrates a block diagram of an exemplary vehicle tracking system 100 in accordance with one or more embodiments. The exemplary system 100 can use the principles as disclosed with the vehicle tracking technique. The vehicle tracking system 100 provides tracking of a user through the use of a mobile computing device 110 and a client application on the computing device 110. The client application on the mobile device 110 (also called a client terminal) can connect to and access other applications and any other available technology on the mobile device 110. For example, the client application can access the camera or the geolocation services of the mobile device 110. The client application provides a graphical user interface for user interaction and to present any views as disclosed with the vehicle tracking technique. The client application interfaces with input and output devices of the mobile device, such as a touchscreen of a smart phone. The client application can have access to a user's geographical location, location data, product and social network data, and communications protocols. Although the exemplary embodiment illustrates a single mobile device 110, any number of mobile devices can be used with the vehicle tracking system 100.

One or more mobile devices 110, each with a client application, may be coordinated by a vehicle tracking server 100, and can comprise mobile telephones, personal data assistances, tablet computers, notebook computers, or any other type of computing device. Within the vehicle tracking system 100, the mobile device 110 is configured to connect to the vehicle tracking server 130 via a computer network 120, such as the Internet. The vehicle tracking server 130, which is also referred to herein as the platform server, is also configured to connect to a computer network 120, such as the Internet. In other embodiments, the computer network 120 can be a private access network. Of course, other means of connecting the mobile device 110 and the vehicle tracking server 130 to a computer network 120 may also be used, either currently existing or later developed.

In an exemplary embodiment, the system 100 includes geographic localization of the mobile device 110 associated with users accessing the system 100. In one embodiment, the use of a geolocation service 150 for the system 100 may be provided or confirmed using GPS satellite location techniques. More specifically, one or more GPS satellites may be used in connection with GPS-based hardware/software in one or more of the context to determine the geographical location of the mobile device 110. Alternatively, the geographic location of one or more of the mobile devices 110 may be provided or confirmed using one or more cellular towers of a cellular service 160. In such embodiments, geographic location of the mobile device 110 is determined by a mobile telecommunications network via, for example, the location of the cell tower (i.e., the actual node of a cell tower servicing the mobile device 110), which is updated by the mobile device 110 when it changes from one cell tower to another.

Still further, the mobile device 110 may comprise an application loaded thereon that facilitates the determination of the geographic location of the mobile device 110 having the application. Moreover, such an application may be specifically associated with or developed by the provider of the system 100, or by a third party. In yet other embodiments, a computer network 120 may simply detect when the mobile device 110 is within a predetermined distance. In these embodiments, a mobile application may provide the location of the mobile device 110 by pinging a local network. Alternatively, rather than an application, the mobile device 110 may include geolocation hardware or software, such as RFID technology or Bluetooth. Other possible location technologies or techniques, whether specifically in a mobile device application or not, may include GPS technology, Assisted GPS technology (AGPS), Differential GPS (DGPS) technology, Time of Arrival (TOA) technology, Enhanced Time of Arrival (ETOA) technology, Maximum Likelihood (ML) and Least-Square (LS) location techniques, Angle of Arrival (AOA) location technique, Received Signal Strength (RSS) localization, Signal Fingerprinting, MAC address, Wi-Fi or other wireless computer/telecommunications technology location systems, Internet Protocol (IP) address, BEACON, and RFID technology. Of course, these techniques for location determination are simply exemplary, and thus can encompass any computing device location technique, either now existing or later developed.

In addition to determining and confirming the geographic location of the mobile device 110, the system 100 can limit access by users based on geographical location of the mobile device 110. For example, a closed course proprietor may require patrons to pay a fee to use the closed course, and only paying patrons are given an access code or password to access a user-restricted set of geolocation positions representing the closed course. Such access codes or passwords may be the same for all users wishing to access the system, or the closed course proprietor can access the system 100 to authorize the user to access the set of geolocation positions.

Access codes can also be provided in other embodiments so that multiple mobile devices of the user can interact with the system 100. For example, a user may utilize two mobile devices in accessing the vehicle tracking system 100, such as a mobile phone and wearable technology such as a smartwatch, and uses the smartwatch for tracking his movements on the closed course and uses the mobile phone for viewing his profile or friend list. Access codes allow the multiple mobile devices to synchronize information with each other.

In another embodiment, the mobile device 110 can be safely attached to the vehicle. A mount can be used to attach the mobile device 110 to accurately track the vehicle's course and to prevent the mobile device 110 from moving while the user is logging laps on the closed course. The mount can position the mobile device 110 into a position where the user can easily access between logging laps on the closed course. For example, the mobile device 110 can be mounted in a safe and stable location on a vehicle.

The vehicle tracking server 130 can be a centralized computing system or device for coordinating a plurality of mobile devices 110. The server 130 coordinates and communicates through a computer network 120 such as the Internet with geolocation services 150, cellular service 160, and other services available to the mobile device 110. The server 130 also communicates and coordinates with a database 140 for user information, lap data, and information collected from the mobile device 110. The database 140 may also comprise data from closed course proprietors, including the set of geolocation positions of closed courses, trophies and prizes for closed courses, and any other information of the closed courses.

The vehicle tracking server 130 can comprise a front end server for handling data requests or web page requests from users, processing the requests and returning the data, an application programming interface server, a database server, and a location determination server. The vehicle tracking server 130 can also contain any number of servers required to operate the interactions between the vehicle tracking server 130, the mobile device 110, and the geolocation service 150, the cellular service 160, and any other component of the system 100.

The messaging server 170 of the vehicle tracking system 100 provides the infrastructure for messaging between users. The messaging server 170 also facilitates messages from users to closed course proprietors, so that users can report other users, problems with the closed course, or any other messages meant for the closed course proprietor. The messaging server 170 can use SMS, a messaging interface for use only with the system 100, or any other type of messaging technology to facilitate the messaging as disclosed. The messaging server 170 can interact with the vehicle tracking server 130 to create a graphical user interface within the client application for messaging between users. Any currently available or later developed messaging or communication protocol can be used with the messaging server 170.

As previously mentioned, the mobile device 110 can comprise an application or service loaded thereon that facilitates the determination of the geographic location of the mobile device 110 having the application, and a geolocation service 150 interfaces and communicates with the application through the computer network 120. The geolocation service can comprise GPS technology, Assisted GPS technology (AGPS), Differential GPS (DGPS) technology, Time of Arrival (TOA) technology, Enhanced Time of Arrival (ETOA) technology, Maximum Likelihood (ML) and Least-Square (LS) location techniques, Angle of Arrival (AOA) location technique, Received Signal Strength (RSS) localization, Signal Fingerprinting, MAC address, Wi-Fi or other wireless computer/telecommunications technology location systems, Internet Protocol (IP) address, BEACON, and RFID technology. Again, these technologies and techniques are simply exemplary and thus can encompass any geolocation technology or technique, either now existing or later developed.

In another embodiment, the system 100 can provide a graphical user interface for closed course proprietors to interact with patrons of their closed courses or other third parties to configure any advertising or sponsored content for particular closed courses. In yet another embodiment, the graphical user interface allows the proprietors to access a graphical user interface for generating the set of geolocation positions representing the closed course. Further discussion regarding generating the set of geolocation positions is below.

In another embodiment, the system 100 can access third party data sources to get authentication information. For example, the system 100 can access Facebook services in order to get user information and authentication information, and accordingly, the user can use Facebook to create an account in the system 100. Other social media verification data sources can be used, currently existing or later developed.

The use of social media resources is not required because users are able to create a user account with the system 100 without the use of social media information. The use of social media allows for easier and faster user authentication because in some exemplary embodiments, users can be required to input their username and password upon each activation of the system 100.

A secondary device 180 can also be used with the system 100 so that a user is not using a mobile device 110 or mounting their mobile device 110 onto their vehicle. The secondary device 180 can be another computing device for tracking movements of the user, such as a GPS tracking unit that determines and tracks the unit's precise location at intervals. The secondary device 180 can store recorded geolocation data for later transmission and analysis, or the secondary device 180 can transmit recorded geolocation data to the server 130 using the computer network 120 or any other type of transmission technology. Another example of a secondary device 180 can be smartwatches or wearable technology that tracks geolocation of the user.

FIG. 2 is an exemplary illustration 200 of a set of geolocation positions on a closed course. As previously discussed, the set of geolocation positions 210-230 are located on the closed course 205.

The set of geolocation positions 210-230 are made by the closed course proprietors, and in creating the set of geolocation positions 210-230, proprietors use a similar tracking technique to the tracking of users. The proprietor activates geolocation set creation with the system 100 on his mobile device 110, and the system 100 immediately determines the proprietor's geolocation. This first geolocation is the start/finish point for the proprietor. As the proprietor moves along the closed course, the system 100 records the proprietor's geolocation at certain intervals. In one embodiment, the system 100 records the proprietor's geolocation every 16 meters. These intervals can also vary in amount of distance. When the system 100 detects that the proprietor has either stopped moving or has reached the start/finish point again, then the set of geolocation positions has been created. In another embodiment, the proprietor can deactivate geolocation set creation on his mobile device 110. The system 100 then stores the set of geolocation positions into the central database 140 for retrieval by users.

Referring back to FIG. 2, point 210 represents the starting geolocation of the user in the present exemplary embodiment; in other embodiments, any of the other geolocation positions can be the starting geolocation of the user. The system 100 determines the starting geolocation position for the user and the starting geolocation position among the set of geolocation positions 210-230 by calculating the user's current geolocation and then comparing the user's current geolocation against the set of geolocation positions 210-230. Because a user may not be on or in the exact geolocation position provided in the set 210-230, the system calculates a distance from the user's starting geolocation position to each geolocation position in the set 210-230 to determine whether the user is within a predetermined distance from any of the set of geolocation positions 210-230 or whether a user is in the area formed around each of the set 210-230. For example, in the exemplary embodiment, the area 209 is formed based on a predetermined distance from the geolocation position 210. If the user's geolocation position is within the area 209, then the system 100 can map the user's geolocation position to the geolocation position 210 and the system 100 can mark the geolocation position 210 as completed.

Similarly, when the user is moving on the closed course, the system 100 retrieves the geolocation position of the user to compare against any of the set of geolocation positions 210-230. The system 100 calculates the distance between the user's current geolocation position and the each geolocation position of the set of geolocation positions 210-230. If the calculated distance between the user's current geolocation position and a particular geolocation position of the set 210-230 is equal to or less than a predetermined distance, such as 8 meters, then the system 100 marks the particular geolocation position as complete. In an alternate embodiment, the system 100 determines whether the user's current geolocation position is within the area based on the predetermined distance from any of the set of geolocation positions 210-230, and if the user's current geolocation position is within the area of any of the geolocation positions 210-230, then the geolocation position of the set 210-230 for the area is marked as completed.

In another exemplary embodiment, the system 100 can determine whether the user's current geolocation position is within the areas around of geolocation positions that have not been marked as completed. For example, in an exemplary embodiment, the system has marked geolocation locations 210, 211, 212, 213, and 214 as complete because the user's tracked movements and tracked geolocation indicated that the user has traveled through the circles formed by each geolocation position. However, the user did not appear within the area around geolocation 215 and did appear within the area around geolocation 216. Accordingly, geolocation 216 is marked as complete by the system 100 even though the user did not appear within the area of geolocation 215.

In another embodiment, because the closed course proprietors can create and modify the set of geolocation positions 210-230 of the closed course 205, closed course proprietors can also set the predetermined distance and corresponding area for all the geolocation positions 210-230 or the closed course proprietors can set a predetermined distance and corresponding area for each of the geolocation positions. For example, the closed course proprietors can set the predetermined distance to be 8 meters for all of the geolocation positions, but they also have the option to set one of the geolocation positions to 6 meters instead of 8. Closed course proprietors may modify the predetermined distance to more accurately reflect the closed course 205.

FIG. 2 illustrates the completed geolocations not shaded (210, 211, 212, 213, 214, 216, 228, 229, and 230) and the others shaded in based on a trend line mechanism as used by the system. In the exemplary embodiment, each established closed course in the system 100 has a success rate (also referred herein as a predetermined success threshold). The success rate is used to make sure that users do not cut the course or cheat. The success rate may be defined by the closed course proprietor or by the system, based on an ongoing aggregation and normalization of the completion rates by users. In one embodiment, the success rate is set at a default of 70%. The success rate is the threshold for the system 100 to consider a lap as complete, and the success rate is based on the number of completed geolocation positions against the total number of geolocation positions in the set of geolocation positions 210-230 for the closed course 205. For example, the exemplary closed course 205 of FIG. 2 has a predetermined success rate of 70% and has 21 geolocation positions in the set of geolocation positions 210-230. If a user completes only 9 of the 21 geolocation positions of the set 210-230, the user's completion rate is only 42.8% which is below the determined success rate of 70% and accordingly the user did not complete the lap around the closed course. When the system 100 has determined that the user has not completed the lap around the closed course 205, then the lap is not recorded as a lap in the system 100. In one embodiment, the timer also continues to run without resetting and thereby creates a track cut penalty. However, if the user completes 17 of the 21 geolocation positions of the set 210-230, the user's completion rate is 80.95% which is above the determined success rate of 70% and accordingly the user completed the lap. When the system 100 determines that the user has completed the lap, then the lap is counted, lap information is recorded, and the timer for the lap is reset.

Further, in another embodiment, after the system determines that the user has completed the lap, the system 100 resets the set of geolocation positions to incomplete.

Distance calculation and geolocation functionality can be provided through currently available technology, such as CoreLocation, or later developed technology and services.

The use of the success rate also accounts for inconsistencies and errors of geolocation technology and services, such as a weak signal reception by the mobile device 110. For example, point 220 of FIG. 2 is a geolocation position that was recorded into the set of geolocation positions 210-230 but is not on the closed course 205. When the proprietor created the set of geolocation positions 210-230, the geolocation services may have glitched or some other error may have occurred when attempting to record a geolocation position on the closed course 205 between point 219 and 221, and so the system 100 may have inadvertently recorded point 220 using geolocation coordinates not on the closed course 205. The success rate accounts for these errors because the system 100 recognizes that a user cannot usually mark each geolocation position of the set 210-230 as complete, especially geolocation positions not along the closed course 205.

Figure 3:
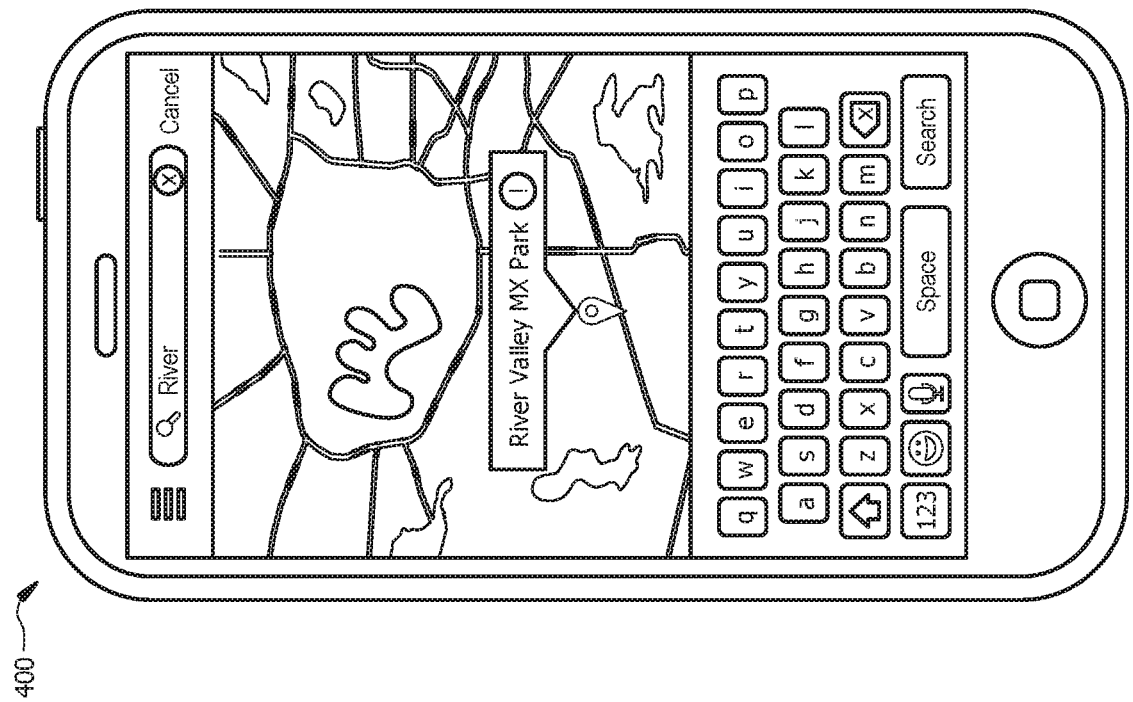
FIG. 3 illustrates an exemplary embodiment of a screenshot of a graphical user interface, in accordance with the disclosed principles, for a closed course with information about the best lap times for the closed course, and for a user to start tracking his movements along the closed course.

FIG. 3 illustrates an exemplary embodiment of a screenshot 300 of a graphical user interface, in accordance with the disclosed principles, for a closed course with information about the best lap times for the closed course, and for a user to start tracking his movements along the closed course. The screenshot 300 provides an exemplary image 310 of the closed course with the closed course's location. As shown in the screenshot 300, the graphical user interface provides a button 320 for activating tracking of the user's movements on the closed course. In the exemplary embodiment, the graphical user interface provides a podium list 330 of users with the best lap times at the closed course. Each lap entry of the podium list 330 provides the user's screenname, the lap time, the date of the lap time, and the user's rider number, and the user's lap ranking. The list 330 can have any number of entries shown to users. Additionally, the exemplary embodiment is directed to motocross racing and accordingly, each entry provides the brand of the user's motorcycle. The exemplary embodiment provides the top five lap times at a closed course; however, in other embodiments, more lap times can be viewed. The graphical user interface also shows a section 340 for the user's best lap entry at the closed course, and in the present exemplary embodiment, the user's best lap time coincides with the second best lap time at the closed course. A button 350 below the user's best lap section 340 is available for the user to select and use to view the best lap times for all users.

In another embodiment, the graphical user interface providing information for a closed course can also include other information about the closed course, such as a physical address, phone number, and website when the image 310 is selected. Users can also filter the information for the closed course and the entries of the list 330 to show specific information based on a variety of filters.

Figure 4:
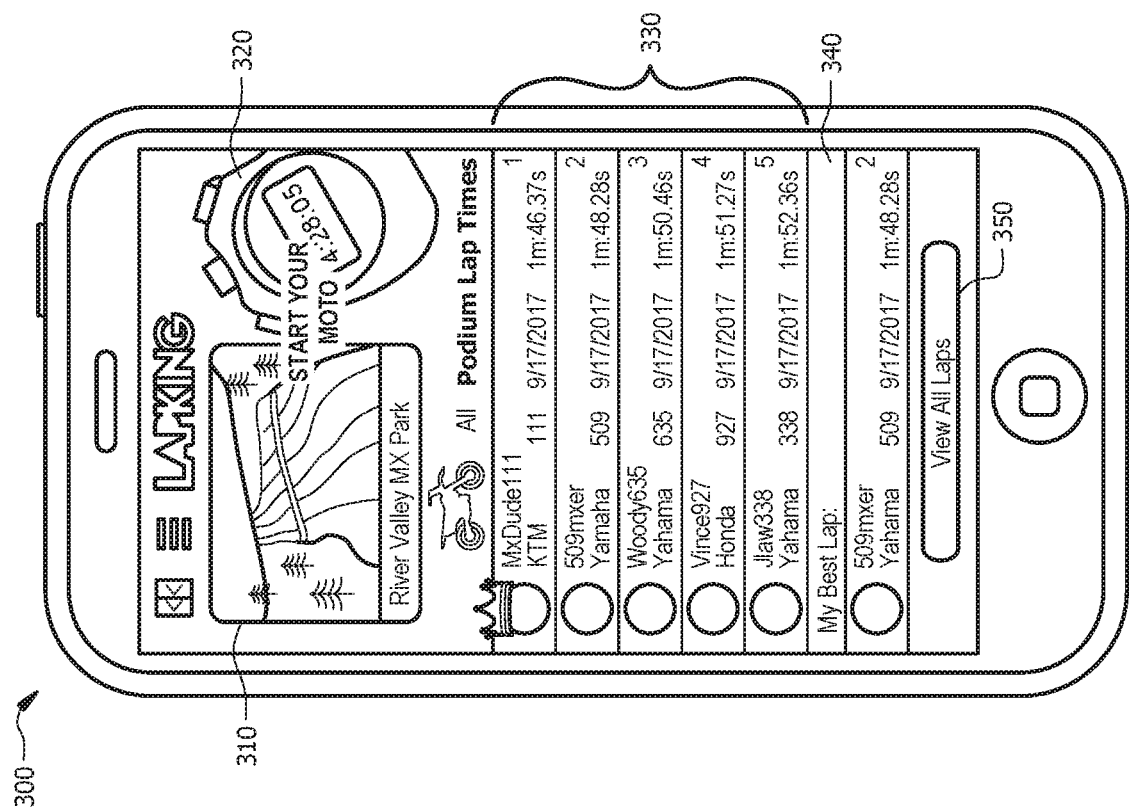
FIG. 4 illustrates an exemplary embodiment of a screenshot of a graphical user interface demonstrating geographically finding a nearby established closed course.

FIG. 4 illustrates an exemplary embodiment of a screenshot 400 of a graphical user interface demonstrating geographically finding a nearby established closed course. In the present exemplary embodiment, the user can search for closed courses based on the name of the closed course as established, on the geographical proximity to the user, and any other search factors available. The screenshot 400 illustrates a map view of the searched-for closed course for selection by the user. As previously mentioned, the user can search for closed courses using any type of geolocation service, including GPS and cellular technology. Further, user can utilize map functionality that can be found in other currently available and later developed map services, like zooming in or zooming out.

In another embodiment, some closed courses may be found after the user has visited the closed course and the closed course proprietor has provide authorization to the user to access information about the closed course. Accordingly, some closed courses may be a private closed course where membership is restricted.

Figure 5:
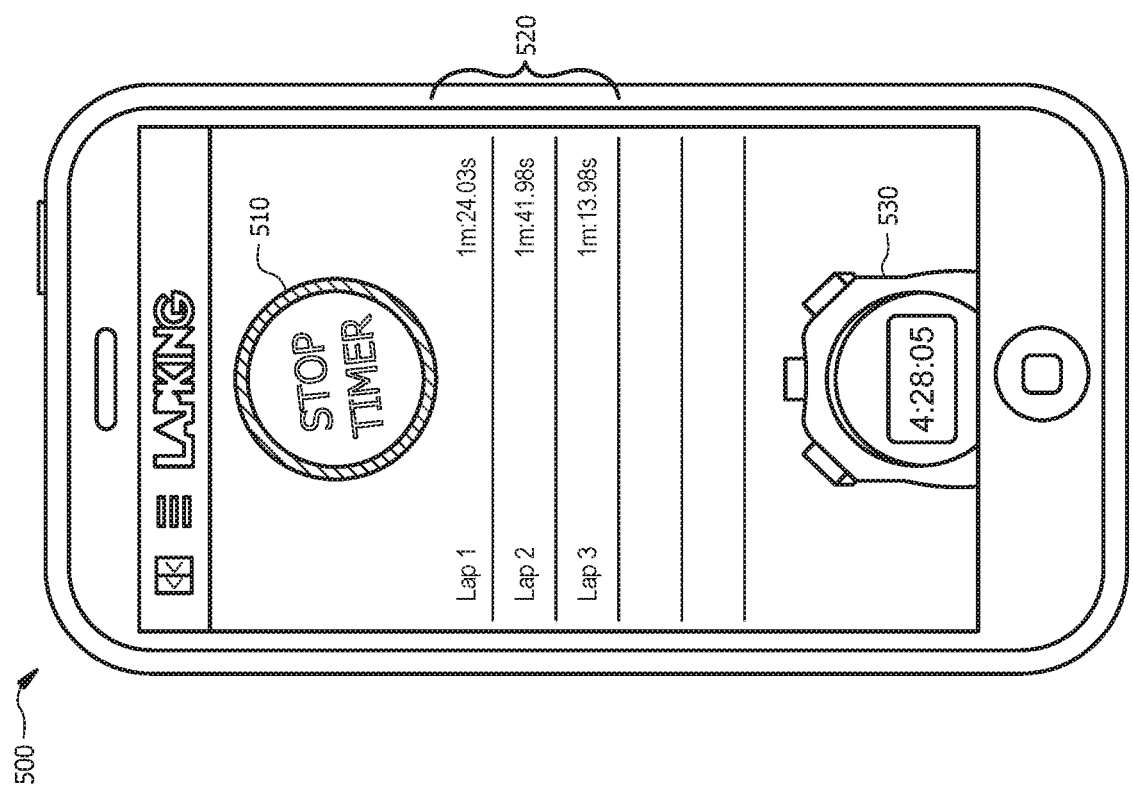
FIG. 5 illustrates an exemplary embodiment of a screenshot of a graphical user interface for activating tracking of the user's movements on a closed course, where the interface also shows lap times on the closed course of the current session.

FIG. 5 illustrates an exemplary embodiment of a screenshot 500 of a graphical user interface for deactivating the tracking of the user's movements on a closed course, where the interface also shows previous lap times on the closed course. In the present exemplary embodiment, the user pressed the button 320 of FIG. 3 to get to the present view of the graphical user interface as provided in screenshot 500. In the exemplary screenshot 500, the graphical user interface provides a button 510 for starting and stopping the tracking functionality of the vehicle tracking system 100. The present exemplary screenshot illustrates the button 510 for stopping the tracking functionality and provides the words "Stop Timer"; in another exemplary embodiment, the button 510 provides activating of the tracking functionality and the words "Start Timer." Additionally, in the present exemplary embodiment, the graphical user interface provides a list 520 of the user's previous lap times at the selected closed course, and each entry on the list 520 provides the lap number and the completed lap time. The present exemplary screenshot 500 provides a stopwatch 530 at the bottom of the graphical user interface, and the stopwatch 530 can provide a real-time and current visualization of the user's time as he moves on the closed course. In another embodiment, users can turn on/off real-time updates to a leaderboard for the closed course.

Figure 6:
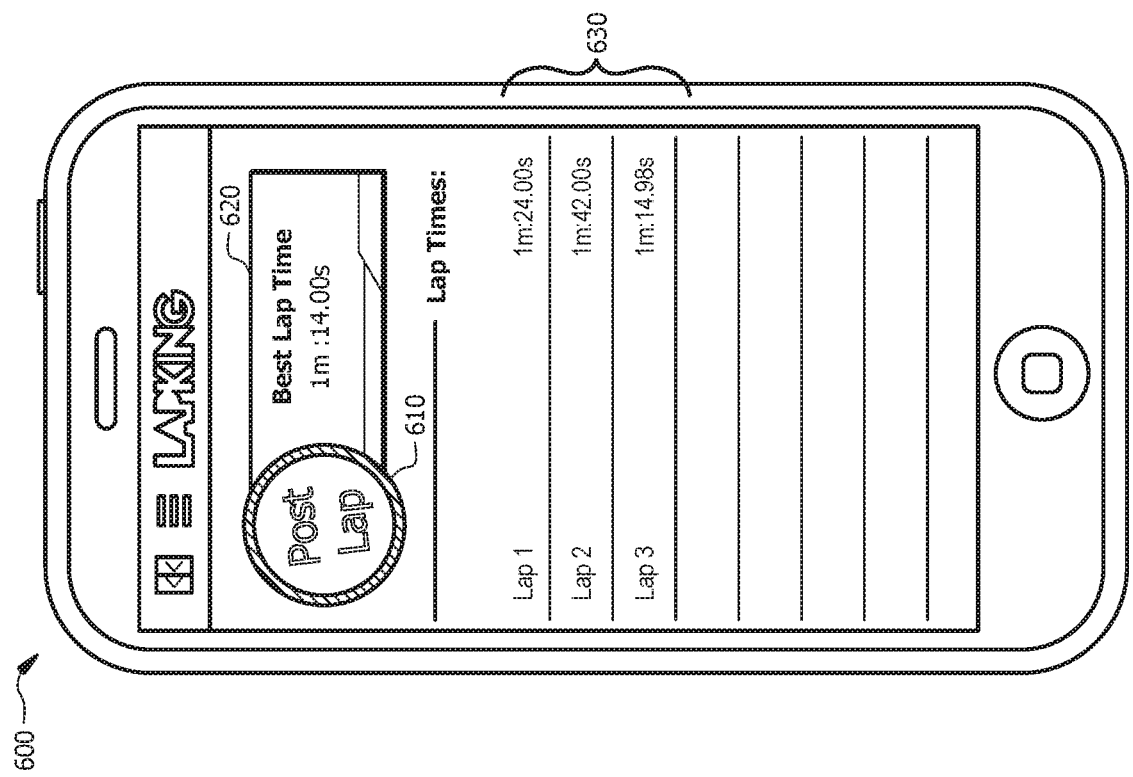
FIG. 6 illustrates an exemplary embodiment of a screenshot of a graphical user interface for posting a user's best lap time after the user completed a lap and the lap time for the lap is the user's best time so far.

FIG. 6 illustrates an exemplary embodiment of a screenshot 600 of a graphical user interface for posting a user's best lap time after the user completed a lap and the lap time for the lap is the user's best time so far. In the present exemplary embodiment, the user can press the button 610 to share his lap information, which includes his lap time and the lap rank, with others, such as friends or the public. The graphical user interface in the exemplary screenshot 600 has a header 620 for the user's most recent lap time, and in the present screenshot 600, the user's most recent lap time is his best lap time so far, so when posted, others can also see that the posted lap information is the user's best lap so far. The graphical user interface, again, provides a list 620 of the user's previous lap times at the selected track, along with the lap information of the lap that the user just completed, and each entry on the list 630 provides the lap number and the completed lap time. In another embodiment, the graphical user interface can provide a marker for the user's best lap so the user can more easily find the best lap in the list 630.

Figure 7:
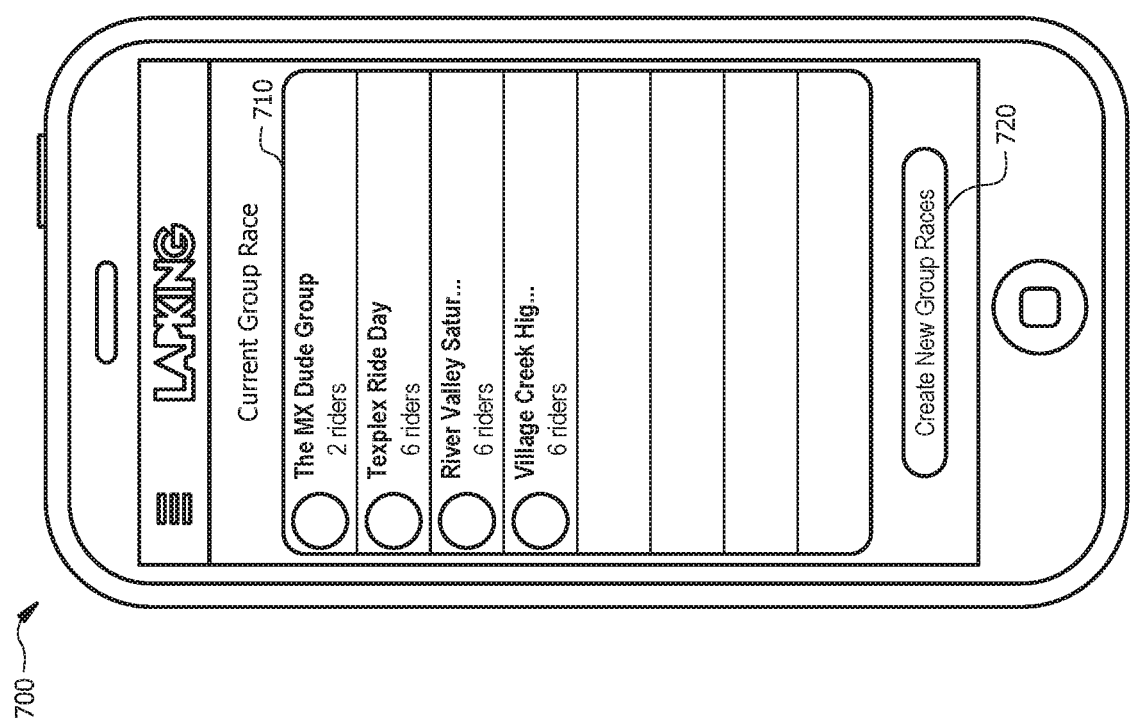
FIG. 7 illustrates an exemplary embodiment of a screenshot of a graphical user interface demonstrating groups of riders currently logging laps around the closed course.

FIG. 7 illustrates an exemplary embodiment of a screenshot 700 of a graphical user interface demonstrating groups of riders currently racing. The system 100 provides a graphical user interface for racing groups. The screenshot 700 of the exemplary graphical user interface illustrates a list 710 of current group races. The system can populate the list 710 based on a variety of factors, such as groups that the user has joined, groups within a predetermined geographical vicinity, groups at a closed course that the user frequents, currently racing groups, etc. The entries of the list 710 comprise the name of the group and the number of users within the group, which may change as users join or leave the group. In an alternative embodiment, the number of users may be based on the number of users currently racing or currently using the client application on their mobile device. Groups decrease the racing risk factors, and allows users to show up at a closed course during the duration of the group race and to log laps at the users' convenience. Group races can also provide trophies or prizes among the group members.

The system also allows users to create new group races via the button 720 on the graphical user interface of screenshot 700. In creating a group race, the user can specify a particular closed course and can invite friends of the user to the group race. The user can also specify the group as a private group, where membership is restricted, or a public group, where membership is not restricted. The user can specify any number of factors for group races.

Figure 8:
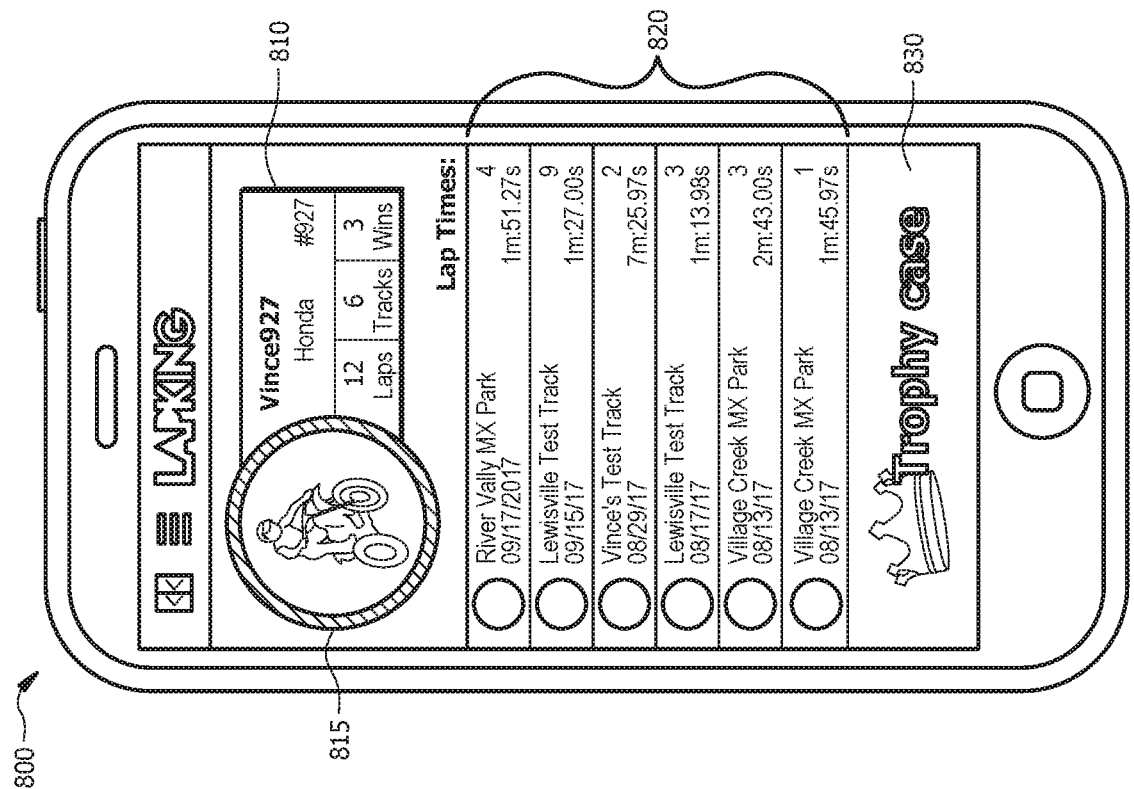
FIG. 8 illustrates an exemplary embodiment of a screenshot of a graphical user interface for a user profile.

FIG. 8 illustrates an exemplary embodiment of a screenshot 800 of a graphical user interface for a user profile. In the user profile of the screenshot 800, information about the user can be provided in a header 810, such as a profile picture 815 of the user, the brand of vehicle used by the user, the number of tracks the user has attended, the number of trophies or prizes won by the user, the number of best lap times the user has, the number of laps posted by the user. User information for the header 810 or in the user profile may be personalized or access-restricted by the user. The screenshot of the graphical user interface also includes a list 820 of the user's laps at various closed courses, and each entry on the list 820 includes the name of the race track, the date of the lap entry, the user's lap time, and any placement of the user's lap at the race track. Any other lap information may also be provided with each entry of the list 820. Also illustrated in the screenshot the graphical user interface is a button 830 to view any trophies or prizes won by the user.

Figure 9:
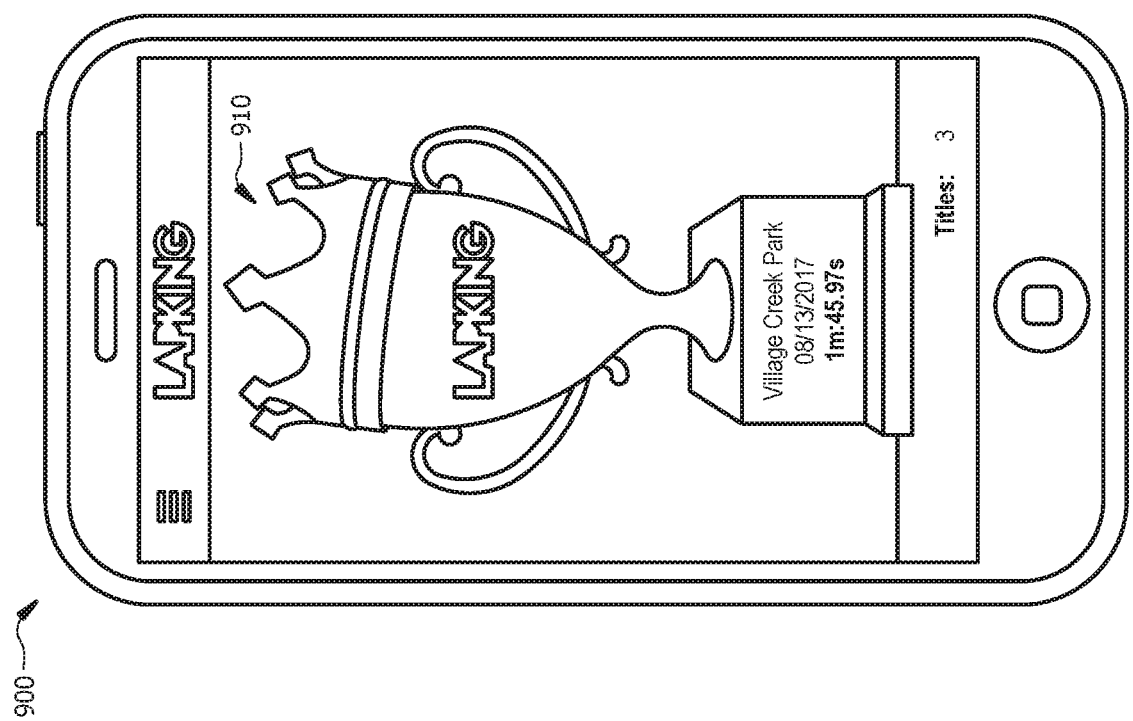
FIG. 9 illustrates an exemplary embodiment of a screenshot of a graphical user interface of a trophy available to the user with the best lap time at a closed course.

FIG. 9 illustrates an exemplary embodiment of a screenshot 900 of a graphical user interface of a trophy 910 available to the user with the best lap time at a closed course. The trophy may have information about the best lap time by the user, such the date of the lap, the lap time, and the closed course of the lap. At the bottom of the graphical user interface, the system can provide the number of trophies, titles, or prizes own by the user. A link to the exemplary graphical user interface can appear in the user profile of FIG. 8.

Figure 10:
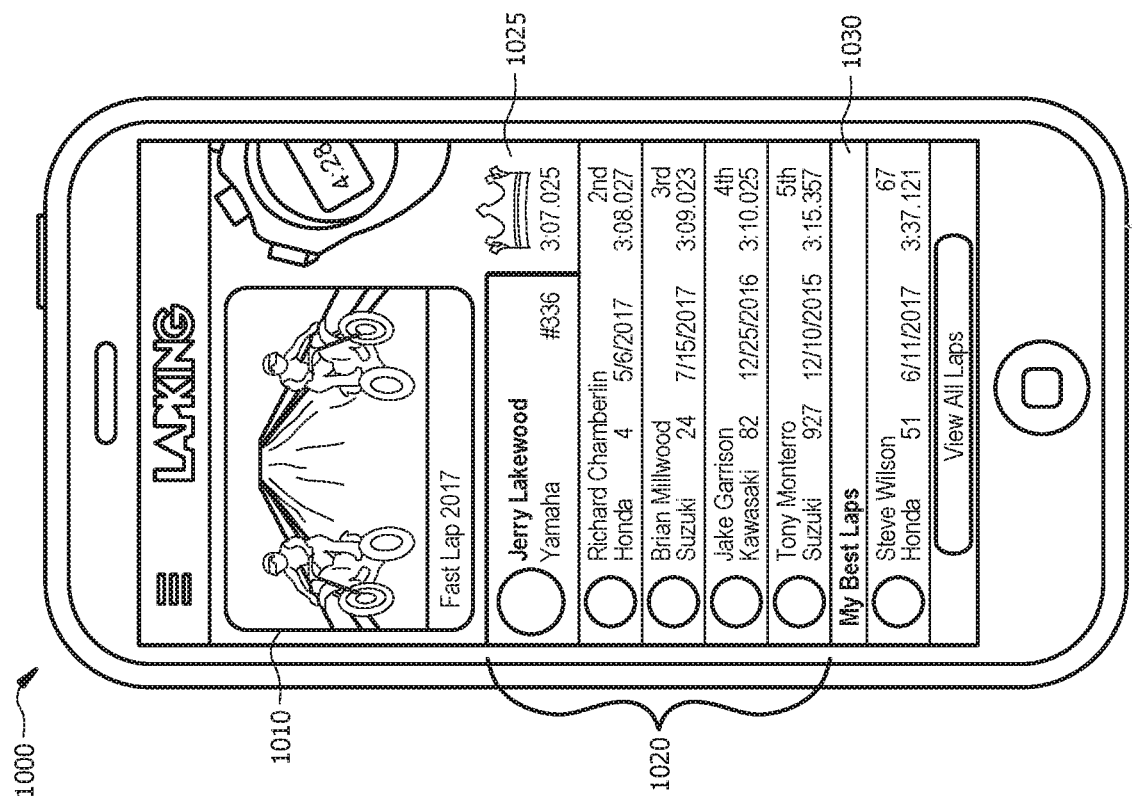
FIG. 10 illustrates an exemplary embodiment of a screenshot of a graphical user interface demonstrating the vehicle tracking system used with racing competitions and events, and presenting information about the racing competition and events with a user's information.

FIG. 10 illustrates an exemplary embodiment of a screenshot 1000 of a graphical user interface demonstrating the vehicle tracking system facilitating video streaming of racing competitions and events, and presenting information about the racing competition and events with a user's information. These racing competitions may be pay-to-play competitions. As shown in the screenshot 1000 of the exemplary embodiment, the graphical user interface includes an image 1010 of a racing competition. The image 1010 can accompany information about the racing competition, such as the name and location of the racing competition. The vehicle tracking system 100 can be used to provide viewers and fans of the racing competition the ability to get a real-time view and updates of the competition. The graphical user interface comprises a list 1020 of the competitors, each having a mobile device with the client application of the system 100. Each entry of the list has information about the competitor, such as the competitor's name and their vehicle, their number in the competition, and any lap information. For example, in the exemplary embodiment, each entry has the competitor, the vehicle used by the competitor, the competitor's entry number in the competition, the competitor's best lap, including information about the date of the lap and the lap time, and the competitor's current standing in the competition. The list 1020 may also have a marker 1025 for indicating the competitor with the fastest lap time. Also illustrated in the graphical user interface of the exemplary screenshot, is the user's best lap information in the section 1030 below the list 1020, and this section 1030 provides similar information as the list 1020.

In other embodiments, the image 1010 can be a video stream of the racing competition from a commentator's perspective, or from any racer's perspective. The video stream may be computer-generated representation of the closed course with each participant's real-time location along the closed course.

The competitions as contemplated above may take over a large period of time so as to allow as many competitors as possible. These competitions may also take place over multiple closed courses, so the system can provide additional graphical user interfaces that provide similar information as the graphical user interface in screenshot 1000.

Figure 11:
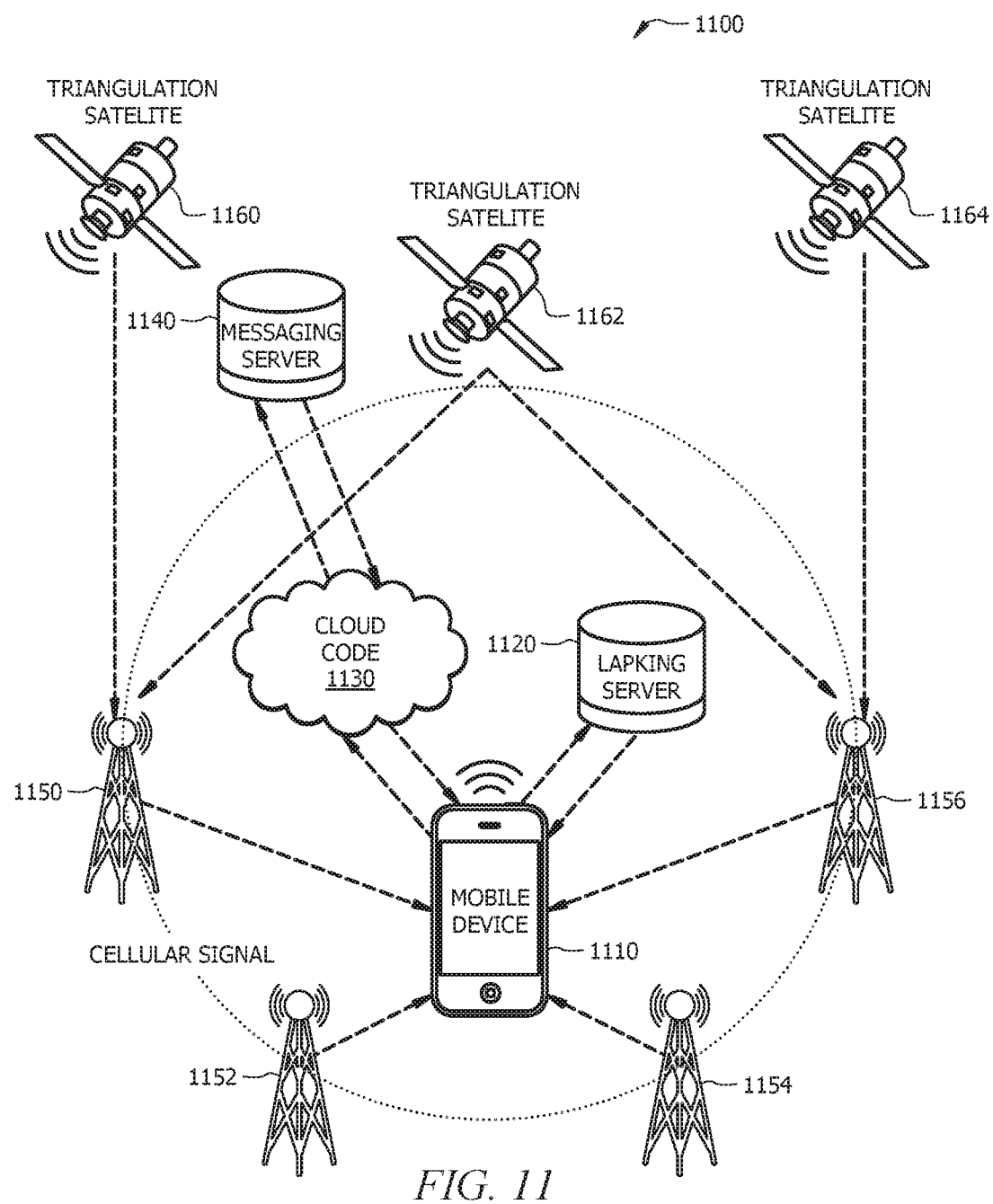
FIG. 11 is another block diagram of an exemplary embodiment of the vehicle tracking system.

FIG. 11 is another block diagram of an exemplary embodiment of the vehicle tracking system 1100. The vehicle tracking system 1100 includes at least one mobile device 1110 for a user. The mobile device 1110 connects to the server 1120 and to the cloud code 1130 for receiving and sending data from databases (not illustrated) connected to the server 1120 and the cloud code 1130. The cloud code 1130 also connects to a messaging server 1140 for providing communication protocols between the mobile device of the user and mobile device of other users. The mobile device 1110 also connects with cellular towers 1150, 1152, 1154, 1156 which retrieve geolocation data for triangulation data from satellites 1160, 1162, and 1164. In the exemplary embodiment, the geolocation data is based on triangulation of multiple satellites 1160, 1162, and 1164.

The cloud code 1130 allows for push notifications to the mobile device 1110, regardless whether the client application on the mobile device 1110 is active or not. The cloud code 1130 also interfaces the mobile device 1110 for and/or with any network-based or cloud-based services for the client application on the mobile device 1110, such as geolocation services and social networking services. The cloud code 1130 comprises currently available and later developed technology for interfacing between the mobile device 1110 and the messaging server 1140.

In an exemplary embodiment, geolocation data can be calculated based on a triangulation of either multiple satellites 1160, 1162, 1164 or multiple cellular towers 1150, 1152, 1154, 1156. Geolocation data may be transmitted from the satellites 1160, 1162, 1164 to the cellular towers 1150, 1152, 1154, 1156 for transmission to the mobile device 1110. The geolocation data is then processed by the client application of the mobile device 1110 to perform the principles disclosed in other exemplary embodiments.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to (a) information permanently stored on non-writeable storage media (e.g., read only memory devices within a computer such as ROMs or CD-ROM disks readable only by a computer I/O attachment); (b) information alterably stored on writeable storage media (e.g., floppy disks and hard drives); or (c) information conveyed to a computer through communication media, such as a local area network, a telephone network, a public network like the Internet. It should be understood, therefore, that such media, when carrying computer readable instructions that direct the method functions of the present invention, represent alternate embodiments of the present invention.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than recited unless the particular claim expressly states otherwise.

Additional Description

The following paragraphs are offered as further description of the various embodiments disclosed invention.

In a first embodiment, novel aspects of the present disclosure describe a computer-implemented method for tracking a vehicle's course using geolocation data, the method comprising: obtaining, from a central database, a set of predetermined location positions representing a closed course; tracking movements of a user using a location determination controller, where tracking the movements of the user further comprises timing the movements of the user; authenticating the movements of the user against the set of predetermined location positions while the client terminal is within a predetermined distance of at least one of the set of predetermined location positions; upon determining whether successful authentication of the user's movements is greater than a predetermined success threshold, storing timing information in the central database, and retrieving and presenting the timing information on the client terminal.

In another aspect of the first embodiment, novel aspects of the present disclosure describe a computer-implemented method for tracking a vehicle's course using geolocation data, the method comprising: obtaining, from a central database, a set of predetermined location positions representing a closed course; tracking movements of a user using a location determination controller, where tracking the movements of the user further comprises timing the movements of the user; authenticating the movements of the user against the set of predetermined location positions while the client terminal is within a predetermined distance of at least one of the set of predetermined location positions; upon determining whether successful authentication of the user's movements is greater than a predetermined success threshold, storing timing information in the central database, and retrieving and presenting the timing information on the client terminal; and one or more limitations selected from the following list:

wherein tracking the movements of the user employs at least one of GPS technology, Assisted GPS technology (AGPS), Differential GPS (DGPS) technology, Time of Arrival (TOA) technology, Enhanced Time of Arrival technology, Maximum Likelihood and Least-Square location techniques, Angle of Arrival location technique, Received Signal Strength localization, Single Fingerprinting, WIFI, and RFID technology;

wherein the predetermined distance is 8 meters;

wherein the method further comprises: aggregating the timing information of a plurality of users into an ordered list and presenting the ordered list to the plurality of users on the graphical user interface on the client terminal;

wherein successful authentication comprises authentication of the predetermined number of the set of predetermined location positions;

wherein the set of predetermined location positions comprises GPS locations;

wherein the set of predetermined location positions comprises a sequence of predetermined location positions;

wherein the method further comprises: tracking a second user's geolocation positions at predetermined intervals to generate the set of predetermined location positions; and uploading the set of predetermined GPS locations to the central database;

wherein the predetermined success threshold is defined by ongoing aggregation and normalization of rates of successful authentication;

wherein the predetermined success threshold is 70%;

wherein the predetermined distance is defined by ongoing aggregation and analysis of geolocation information of users;

wherein tracking of the user's movements is activated by a motion sensor;

wherein the set of predetermined location positions are access-restricted.

wherein tracking the user's movements and authenticating the movements of the user starts at any one of the predetermined location positions;

In a second embodiment, novel aspects of the present disclosure describe a system for tracking a vehicle's course using geolocation data, the system comprising: a central processing server in communication with a computer network and configured to obtain information from a central database; one or more client terminals in communication with the central processing server via the computer network, and configured to provide a graphical user interface for user interaction with the central processing server; wherein the one or more client terminals is configured to: obtain, from the central database, a set of predetermined location positions representing a closed course; track movements of a user using a location determination controller, where tracking the movements of the user further comprises timing the movements of the user; authenticate the movements of the user against the set of predetermined location positions while the client terminal is within a predetermined distance of at least one of the set of predetermined location positions; and upon determining whether successful authentication of the user's movements is greater than a predetermined success threshold, storing timing information in the central database, and retrieving and presenting the timing information on the client terminal.

In another aspect of second embodiment, novel aspects of the present disclosure describe a system for tracking a vehicle's course using geolocation data, the system comprising: a central processing server in communication with a computer network and configured to obtain information from a central database; one or more client terminals in communication with the central processing server via the computer network, and configured to provide a graphical user interface for user interaction with the central processing server; wherein the one or more client terminals is configured to: obtain, from the central database, a set of predetermined location positions representing a closed course; track movements of a user using a location determination controller, where tracking the movements of the user further comprises timing the movements of the user; authenticate the movements of the user against the set of predetermined location positions while the client terminal is within a predetermined distance of at least one of the set of predetermined location positions; and upon determining whether successful authentication of the user's movements is greater than a predetermined success threshold, storing timing information in the central database, and retrieving and presenting the timing information on the client terminal; and one or more limitations selected from the following list:

wherein the predetermined distance is 8 meters;

wherein the set of predetermined location positions comprises GPS locations;

wherein the set of predetermined location positions comprises a sequence of predetermined location positions;

wherein the one or more client terminals is further configured to aggregate the consolidated timing information of a plurality of users into an ordered list and present the ordered list to the plurality of users;

wherein successful authentication of the predetermined number of the set of predetermined location positions comprises authentication of the predetermined number of the set of predetermined location positions based on the sequential order;

wherein the one or more terminals is further configured to track the user's geolocation coordinates at predetermined intervals to generate the set of predetermined location positions; and upload the set of predetermined location positions coordinates to the central database;

wherein the predetermined success threshold is defined by ongoing aggregation and normalization of rates of successful authentication;

wherein the predetermined distance is defined by ongoing aggregation and analysis of GPS location information of users;

wherein tracking of the user's movements is activated by a motion sensor;

wherein the set of predetermined location positions locations are access-restricted;

wherein the tracking the user's movements and authenticating the movements of the user starts at any one of the predetermined location positions;

wherein tracking the movements of the user employs at least one of GPS technology, Assisted GPS technology (AGPS), Differential GPS (DGPS) technology, Time of Arrival (TOA) technology, Enhanced Time of Arrival technology, Maximum Likelihood and Least-Square location techniques, Angle of Arrival location technique, Received Signal Strength localization, Single Fingerprinting, WIFI, and RFID technology; and wherein the predetermined success threshold is 70%.

In a third embodiment, novel aspects of the present disclosure describe a closed-course generation system used with a tracking system for tracking a vehicle's course using geolocation data, the closed course system comprising: a central processing server in communication with a computer network and configured to obtain information from a central database; a mobile device in communication with the central processing server via the computer network, comprises a geolocation controller, and is configured to provide a graphical user interface for user interaction with the central processing server; wherein the mobile device is configured to: track a path using the geolocation controller along the closed course; records geolocation positions of the closed course to a set of predetermined geolocation positions; and stores the set of predetermined geolocation positions to the central database; wherein one or more client terminals of the tracking system accesses the set of predetermined geolocation positions in the central database, tracks movements of users of the one or more client terminals, authenticates the movements of the users against the set of predetermined geolocation positions while the one or more client terminals is within a predetermined distance of at least one of the set of predetermined geolocation positions; and upon determining whether successful authentication of the users' movements is greater than a predetermined success threshold, stores timing information in the central database.

In another aspect of the third embodiment, novel aspects of the present disclosure describe a closed-course generation system used with a tracking system for tracking a vehicle's course using geolocation data, the closed course system comprising: a central processing server in communication with a computer network and configured to obtain information from a central database; a mobile device in communication with the central processing server via the computer network, comprises a geolocation controller, and is configured to provide a graphical user interface for user interaction with the central processing server; wherein the mobile device is configured to: track a path using the geolocation controller along the closed course; records geolocation positions of the closed course to a set of predetermined geolocation positions; and stores the set of predetermined geolocation positions to the central database; wherein one or more client terminals of the tracking system accesses the set of predetermined geolocation positions in the central database, tracks movements of users of the one or more client terminals, authenticates the movements of the users against the set of predetermined geolocation positions while the one or more client terminals is within a predetermined distance of at least one of the set of predetermined geolocation positions; and upon determining whether successful authentication of the users' movements is greater than a predetermined success threshold, stores timing information in the central database, and one or more limitations selected from the following list:

wherein the predetermined distance is 8 meters;

wherein the one or more client terminals is further configured to aggregate the timing information of the users into an ordered list and present the ordered list to the users;

wherein successful authentication comprises authentication of the predetermined number of the set of predetermined location positions;

wherein the set of predetermined location positions comprises GPS locations;

wherein the set of predetermined location positions comprises a sequence of predetermined location positions;

wherein the geolocation positions are 16 meters apart from each other;

wherein the predetermined success threshold is defined by ongoing aggregation and normalization of rates of successful authentication;

wherein the predetermined distance is defined by ongoing aggregation and analysis of GPS location information of users;

wherein the predetermined success threshold is 70%;

wherein the set of predetermined location positions locations are access-restricted;

wherein the tracking the user's movements and authenticating the movements of the user starts at any one of the predetermined location positions;

wherein tracking the movements of the user employs at least one of GPS technology, Assisted GPS technology (AGPS), Differential GPS (DGPS) technology, Time of Arrival (TOA) technology, Enhanced Time of Arrival technology, Maximum Likelihood and Least-Square location techniques, Angle of Arrival location technique, Received Signal Strength localization, Single Fingerprinting, WIFI, and RFID technology; and wherein the predetermined success threshold is 70%.

In a fourth embodiment, novel aspects of the present disclosure describe a closed-course generation method used with a tracking system for tracking a vehicle's course using geolocation data, the closed course system comprising: tracking a path using the geolocation controller along a closed course; recording geolocation positions of the closed course to a set of predetermined geolocation positions; and storing the set of predetermined geolocation positions to the central database; wherein one or more client terminals of the tracking system accesses the set of predetermined geolocation positions in the central database, tracks movements of users of the one or more client terminals, authenticates the movements of the users against the set of predetermined geolocation positions while the one or more client terminals is within a predetermined distance of at least one of the set of predetermined geolocation positions; and upon determining whether successful authentication of the users' movements is greater than a predetermined success threshold, stores timing information in the central database.

In another aspect of the fourth embodiment, novel aspects of the present disclosure describe a closed-course generation method used with a tracking system for tracking a vehicle's course using geolocation data, the closed course system comprising: tracking a path using the geolocation controller along a closed course; recording geolocation positions of the closed course to a set of predetermined geolocation positions; and storing the set of predetermined geolocation positions to the central database; wherein one or more client terminals of the tracking system accesses the set of predetermined geolocation positions in the central database, tracks movements of users of the one or more client terminals, authenticates the movements of the users against the set of predetermined geolocation positions while the one or more client terminals is within a predetermined distance of at least one of the set of predetermined geolocation positions; and upon determining whether successful authentication of the users' movements is greater than a predetermined success threshold, stores timing information in the central database, and one or more limitations selected from the following list:

wherein the predetermined distance is 8 meters;

wherein the one or more client terminals is further configured to aggregate the timing information of the users into an ordered list and present the ordered list to the users;

wherein successful authentication comprises authentication of the predetermined number of the set of predetermined location positions;

wherein the geolocation positions are 16 meters apart from each other;

wherein the predetermined success threshold is defined by ongoing aggregation and normalization of rates of successful authentication;

wherein the set of predetermined location positions comprises GPS locations;

wherein the set of predetermined location positions comprises a sequence of predetermined location positions;

wherein the predetermined distance is defined by ongoing aggregation and analysis of GPS location information of users;

wherein the predetermined success threshold is 70%;

wherein the set of predetermined location positions locations are access-restricted;

wherein the tracking the user's movements and authenticating the movements of the user starts at any one of the predetermined location position;

wherein tracking the movements of the user employs at least one of GPS technology, Assisted GPS technology (AGPS), Differential GPS (DGPS) technology, Time of Arrival (TOA) technology, Enhanced Time of Arrival technology, Maximum Likelihood and Least-Square location techniques, Angle of Arrival location technique, Received Signal Strength localization, Single Fingerprinting, WIFI, and RFID technology; and wherein the predetermined success threshold is 70%.

The invention claimed is:

1. A system for tracking a user's movement along a course using geolocation data, the system comprising:
at least one server in communication with at least one client terminal connected to a computer network, the at least one server configured to obtain information from a database, wherein the at least one client terminal is configured to provide a user interaction with the at least one server;
wherein the at least one server is configured to receive a set of tracking information of a user from the at least one client terminal, wherein the set of tracking information contains a plurality of position coordinates that are authenticated by determining that at least one of the plurality of position coordinates is within a predetermined distance of at least one of a set of predetermined coordinates; and
upon determining that the plurality of position coordinates satisfy a predetermined success threshold for the course by being authenticated at a threshold number of the predetermined coordinates, storing at least one attribute of the set of tracking information in the database.

2. The system of claim 1, wherein the set of tracking information further comprises a set of timing information of the plurality of position coordinates.

3. The system of claim 1, wherein the at least one attribute of movements further comprises at least one time measurement.

4. The system of claim 1, wherein the server provides the at least one client terminal the set of predetermined coordinates representing a course from the database.

5. The system of claim 1, wherein the at least one server is configured to allow for an aggregation of the at least one attribute for a plurality of users based on a grouping criteria.

6. The system of claim 1, wherein the course is a closed course.

7. The system of claim 5, wherein the at least one client terminals is further configured to display the aggregation of the at least one attribute for the plurality of users based on the grouping criteria.

8. The system of claim 5 wherein the server is configured to allow for the selection of a plurality of users as a group for which the server will aggregate and display the at least one attribute for the plurality of users in the group.

9. The system of claim 1 configured to allow the user to specify a plurality of factors to determine the plurality of users of the group.

10. The system of claim 9 wherein the plurality of factors comprises one or more of the following: a specific course, a specific geographic area, a current group of the user, a specific predetermined coordinate and a friend status.

11. The system of claim 1 wherein the server is configured to provide a virtual trophy to a user having a best lap time at a particular closed course.

12. The system of claim 1, wherein the client terminal is a mobile device.

13. The system of claim 1, wherein the client terminal is a combination of a mobile device and a GPS tracking unit.

14. The system of claim 1, wherein the plurality of position coordinates are authenticated by the server to determine whether the success threshold is satisfied.

15. The system of claim 1, wherein the plurality of position coordinates are authenticated by the at least one client terminal to determine whether the success threshold is satisfied.

16. A system for tracking a user's movement along a course using geolocation data, the system comprising:
at least one client terminal in communication with at least one server connected to a computer network, the at least one client terminal configured to obtain information from a database, wherein the at least one client terminal is configured to provide a user interaction with the at least one server;
wherein the at least one client terminal is configured to send a set of tracking information of a user to the at least one server, wherein the set of tracking information contains a plurality of position coordinates that are authenticated by determining that at least one of the plurality of position coordinates is within a predetermined distance of at least one of a set of predetermined coordinates; and
upon determining that the plurality of position coordinates satisfy a predetermined success threshold for the course by being authenticated at a threshold number of the predetermined coordinates, storing at least one attribute of the set of tracking information in the database.

17. The system of claim 16, wherein the plurality of position coordinates are authenticated by the server to determine whether the success threshold is satisfied.

18. The system of claim 16, wherein the plurality of position coordinates are authenticated by the at least one client terminal to determine whether the success threshold is satisfied.

19. The system of claim 16, wherein the course is a closed course.

20. The system of claim 16, wherein the server provides the at least one client terminal the set of predetermined coordinates representing a course from the database.

* * * * *